No. 695,022. Patented Mar. 11, 1902.
L. ALBERTSON.
FITTING FOR PIPES OR RODS.
(Application filed Oct. 4, 1901.)

(No Model.)

WITNESSES:

INVENTOR
Linden Albertson,
BY
ATTORNEY.

UNITED STATES PATENT OFFICE.

LINDEN ALBERTSON, OF NEWARK, NEW JERSEY.

FITTING FOR PIPES OR RODS.

SPECIFICATION forming part of Letters Patent No. 695,022, dated March 11, 1902.

Application filed October 4, 1901. Serial No. 77,548. (No model.)

*To all whom it may concern:*

Be it known that I, LINDEN ALBERTSON, a citizen of the United States, and a resident of Newark, in the county of Essex and State of New Jersey, have invented a new and useful Improvement in Fittings for Pipes or Rods, of which the following is a specification.

My invention relates to that form of fittings which is employed to connect the approaching ends of pipes or rods, and especially to that form thereof in which the body is composed of two hemispherical members that are secured together, whereby to be capable of a circumferential adjustment the one upon the other, with each provided with a rod or pipe connecting projection arranged thereon with its axis in diagonal relationship to that of the plane of its diametrical face. With fittings of this class as heretofore constructed the means by which these hemispherical members have been secured together has consisted of bolts or clamps, which, in consequence of the head that projected from the surface of the member in the one case, and the location of the clamp wholly on the outside of the body portion in the other, render the fitting unsightly and therefore objectionable when employed in connection with fancy railing and in other locations where ornamental appearances are desired. To overcome these defects and produce a fitting which, while capable of adjustment to adapt it to the uniting of rods or pipes that are disposed in the same axial line, or at any angle with respect to each other, shall, at the same time, obviate the objectionable bolt-heads and the joining-clamps on the outside of the same, is the object of my invention.

The invention therefore consists in the peculiarities of construction of the fitting, whereby its component hemispherical members may be firmly secured together in whatever circumferential position the one may be adjusted with respect to the other and the protrusion of bolt-heads or clamps from its exterior surface obviated, all as will hereinafter more fully appear.

Figure 1:
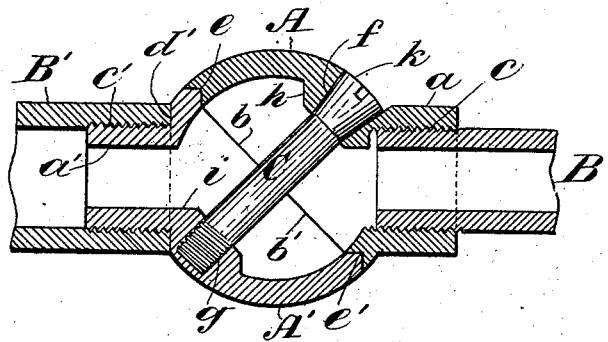
Figure 2:
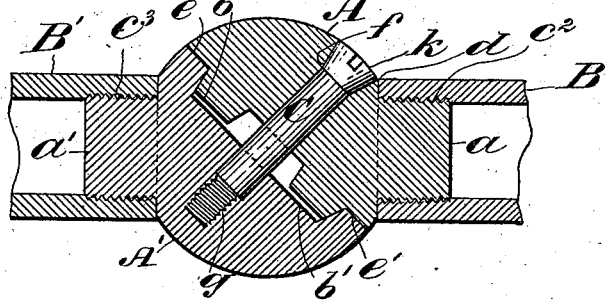

Referring to the accompanying drawings, which form a part of this specification, Figure 1 is a longitudinal vertical section of a fitting constructed in accordance with one form of my invention, with the parts adjusted to firmly connect and hold the approaching ends of two rods or pipes disposed in the same axial line; Fig. 2, a similar longitudinal vertical section of a fitting of a slightly-modified construction, with the parts adjusted to connect and hold the approaching ends of two rods or pipes placed in the same axial line; and Fig. 3, a side elevation of a further modified form of my invention, whereby the approaching ends of two rods or pipes may be firmly held when placed at an angle to each other that is less than ninety degrees.

In all the figures like letters of reference are employed to designate corresponding parts.

A and A' indicate the two main body members, respectively, of my improved fitting, each of which is preferably constructed of hemispherical form, or substantially so, with one provided with a projection $a$ and the other with a projection $a'$, that protrudes from them. These projections, however, instead of extending at right angles to the planes of the circumferential edges $b$ and $b'$ of their respective members A and A' are preferably disposed at acute angles to them, whereby to bring the axes of these projections either into a straight line, as shown in Fig. 1, or into an angle with respect to each other, as shown in Fig. 2, accordingly as the members on which they are formed are rotated in relation to one another in one or the other direction.

In some cases—as, for instance, when the fitting is to be used for conveying water, steam, air, or gases under pressure—the hemispherical members A and A' will be made hollow, as will also be the case with the projections $a$ and $a'$, as shown in Fig. 1. In other cases, on the other hand—as, for instance, where the fitting is to be employed for uniting the ends of the constituent pipes or rods of ornamental railing, fencing, &c.—these hemispherical members, with their respective projections $a$ and $a'$, may be made solid, as shown in Fig. 2. When the projections $a$ and $a'$ are made hollow, either their respective interiors or their respective exteriors may be provided with appropriate screw-threads $c$ and $c'$, and in like manner the exterior of these projections when made solid may be similarly provided with threads $c^2$ and $c^3$. In those cases where the interiors of these projections are threaded they will receive the threaded ends of their respective pipes or rods B and B', which will enter and engage with them. On the other hand, in those cases where these projections are provided with threads upon their exteriors, then only pipes or rods having sockets in their ends can be used in connection with them, and the threaded interior of these pipes or sockets will be screwed upon their respective exteriors, as shown at the left in Fig. 1 and at both the left and right in Fig. 2, and in this construction these projections will be severally provided with appropriate shoulders $d$ and $d'$, against which the ends of those tubes will abut, whereby to obviate any unsightly recesses or channels at those points when the fitting is employed in ornamental work and give to the same a smooth and finished appearance.

When the hemispherical members A and A' are made hollow, the circumferential edge of the former member will preferably be provided with a groove $e$ in its face and the circumferential edge of the latter member will be equipped on its face with a correspondingly-shaped tongue $e'$, which will enter and accurately fit the groove in the other when the two are brought together, and the same is also true when these members are made solid. In some instances this groove will be made in V form and the coöperating tongue in a corresponding inverted-V form, as shown in Fig. 1, while in others this groove will be made either of right-angular or of obtuse-angular form in cross-section and the coöperating tongue of a corresponding shape to accurately fit the same, as shown in Fig. 2. As thus equipped, the hemispherical members A and A' may be adjusted the one upon the other and firmly and inflexibly clamped together with the coöperating tongue and groove in engagement by a screw C, which passes through a suitable orifice $f$, formed in one of the hemispherical members at approximately right angles to the plane of its circumferential edge and engages at its threaded end with a correspondingly-shaped threaded orifice $g$ formed in the other in a similar relationship to the plane of its circumferential edge.

In those instances where the hemispherical members A and A' are made hollow the walls thereof may be made of the proper thickness to afford all necessary strength to the orifices $f$ and $g$ without assistance. I prefer, however, to reinforce these walls at those points by forming thereon suitable bosses, as $h$ and $i$, of which the former will be appropriate to the head of the screw C and the latter to the threaded extremity thereof. When thus constructed, the bosses will be formed upon the inside of their respective hemispherical members in proper angular relationship to the planes of their circumferential edges, and in order that the screw C by which these hemispherical members are secured together may not project beyond the peripheral surfaces thereof I construct its head $k$ in conical form and fit the same to a correspondingly-shaped seat $f$, formed in the member with which it engaged. By this means, as will be seen, the head $k$ is sunken wholly below the surface of the hemispherical member in which the seat $f$ is formed, and the upper end of the same, which is preferably made spherical, is left flush with the outer surface thereof, as shown in the drawings. In most instances the fit between the conical head $k$ and its coöperating seat $f$ will be sufficiently accurate for most purposes without the same being ground together. When, however, the fitting is to be employed in connection with pipes that are to carry gas, steam, or water under pressure, then these parts may be thus treated or a packing interposed between them, as preferred.

Figure 3:
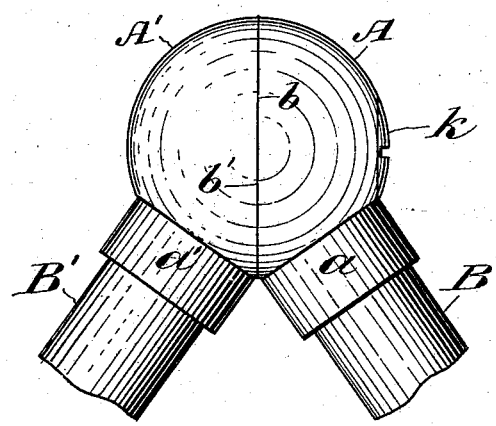

For most purposes the construction of the fitting will be such that the plane of the circumferential edges of the body members A and A' will be disposed at approximately an angle of forty-five degrees to the axes of their respective pipe or rod connecting projections, whereby when these members are so adjusted the one upon the other as to bring both of these axes into a plane passing through the axis of the screw C or of the rotation of the members upon each other the axes of such pipe or rod connecting projections will lie at approximately right angles to each other, as shown in Fig. 2. When, however, the location where the fitting is to be employed requires that this angle shall be reduced, then the hemispherical body members A and A' will be so constructed as to bring the plane of their circumferential edges into an acute angle with respect to the axes of their appropriate pipe or rod connecting projections, as shown in Fig. 3, when a closer approach of these axes to each other will be effected.

With the fitting constructed as above described the adjustment of its parts to adapt it to any required position or location will be effected by first loosening the screw C and then rotating the hemispherical members A and A' upon each other until the axes of the projections $a$ and $a'$ are brought into the required angular relationship with respect to each other, when the appropriate screw C will be screwed tightly into place and the parts thereby firmly and rigidly held in the relative positions respecting one another to which they were thus adjusted. To the projections $a$ and $a'$ the required pipes or rods B and B' may then be respectively secured either by inserting them within the interior of their appropriate projections or by passing them over their exteriors, as the exigencies of the construction may demand.

It will thus be seen that I provide a cheap and efficient fitting for connecting the ends of pipes or rods that is capable of such a range of adjustment as will permit of its employment as a coupling or union to connect such ends whether the pipes or rods appropriate to them are disposed in the same axial line or at any angle to each other.

For connecting the ends of pipes that are to be employed to convey water, steam, air, or gases under pressure, as well as the ends of pipes or rods made use of in the construction of ornamental railings, fences, &c., the advantages of my construction of fitting are apparent, as they will also be for various other purposes not necessary to enumerate herein; but, Having described my invention and specified certain ways in which it is or may be carried into practice, I claim and desire to secure by Letters Patent of the United States—

The combination in a fitting for pipes and rods, with two hollow hemispherical body members A and A' rotatable the one upon the other, with each constructed with a boss protruding from its inner surface, and the one provided with an orifice $f$ extending through it and through its boss at right angles to its hemispherical edge with the outer end of such orifice constructed with a conical seat, and the other provided with a threaded orifice $g$, extending through its boss, in like relationship to its circumferential edge, of a screw C constructed with a conical head $k$ and threaded lower end arranged in such orifices, with the head closely fitting within the conical seat and its threaded lower end engaging with the threaded orifice, and with each of the members provided with a rod or pipe connecting projection disposed at an acute angle to its circumferential edge, whereby the members may be circumferentially adjusted with respect to each other, to adapt the fitting to the joining of the ends of rods or pipes that lie in the same axial line or at an angle to each other, and be firmly clamped together in any adjusted position, with the head of the screw disposed wholly within the seat and its upper end flush with the upper surface of the members, substantially as described.

In witness whereof I have hereunto set my hand this 24th day of September, 1901.

LINDEN ALBERTSON.

Witnesses:
ALLEN P. CREQUE,
R. F. SWEENY.